(12) United States Patent
Kondo et al.

(10) Patent No.: US 8,895,932 B2
(45) Date of Patent: Nov. 25, 2014

(54) SCINTILLATOR PLATE AND RADIATION DETECTION PANEL

(71) Applicant: Konica Minolta, Inc., Tokyo (JP)

(72) Inventors: Masashi Kondo, Hachioji (JP); Keiko Itaya, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/968,952

(22) Filed: Aug. 16, 2013

(65) Prior Publication Data

US 2014/0061481 A1    Mar. 6, 2014

(30) Foreign Application Priority Data

Aug. 28, 2012    (JP) .................................. 2012-187553

(51) Int. Cl.
*G01T 1/10* (2006.01)
*G01T 1/20* (2006.01)
*G01T 1/202* (2006.01)

(52) U.S. Cl.
CPC ............... *G01T 1/2012* (2013.01); *G01T 1/202* (2013.01)
USPC .................................................... 250/361 R

(58) Field of Classification Search
CPC ........ G01T 1/20; G01T 1/2018; G01T 1/2012
USPC .................................................... 250/361 R
See application file for complete search history.

(56) References Cited

U.S. PATENT DOCUMENTS

| | | | | |
|---|---|---|---|---|
| 7,041,982 | B2 * | 5/2006 | Mori et al. ................ | 250/370.11 |
| 7,223,989 | B2 * | 5/2007 | Nakano et al. ............. | 250/484.4 |
| 2003/0155529 | A1 * | 8/2003 | Morikawa et al. .......... | 250/484.4 |
| 2006/0183625 | A1 * | 8/2006 | Miyahara .................... | 501/98.4 |
| 2012/0312999 | A1 * | 12/2012 | Oike et al. ................... | 250/367 |

FOREIGN PATENT DOCUMENTS

| | | |
|---|---|---|
| JP | 2009-103676 | 5/2009 |
| JP | 2011-017683 | 1/2011 |
| WO | 2011/089946 | 7/2011 |

OTHER PUBLICATIONS

Article Physics Today, Nov. 1997, pp. 24-30.
Article Proceedings of Spie, 1997, vol. 3032, pp. 2-13.

* cited by examiner

*Primary Examiner* — Kiho Kim
(74) *Attorney, Agent, or Firm* — Lucas & Mercanti, LLP

(57) ABSTRACT

The scintillator plate has an undercoat layer and a phosphor layer. The phosphor layer has phosphor columnar crystals using the undercoat layer side as a base. When the phosphor layer is halved in terms of thickness in the lamination direction and the respective halves constitute a tip side portion and a base side portion of the phosphor columnar crystals, a ratio (B/A) of an optical transmittance (B) of the base side portion to an optical transmittance (A) of the tip side portion is not less than 70% and not more than 99%.

5 Claims, 5 Drawing Sheets

US 8,895,932 B2

SCINTILLATOR PLATE AND RADIATION DETECTION PANEL

CROSS-REFERENCE TO RELATED APPLICATION

This application dams the priority of Japanese Patent Application No. 2012-187553, filed Aug. 28, 2012, the contents of which are incorporated herein by reference.

TECHNICAL FIELD

The present invention relates to a scintillator plate that can be used in an indirect conversion type flat panel detector (FPD), a radiation detection panel consisting of the scintillator plate, and a manufacturing method thereof.

BACKGROUND ART

Conventionally, radiographic imaging such as X-ray imaging has been widely used for the diagnosis of symptoms in healthcare settings. In particular, as a result of improvements in sensitivity and image quality achieved over its long history, radiographic imaging using an intensifying screen-film system is now used in healthcare settings throughout the world as an imaging system combining high reliability and excellent cost performance. However, this image information is so-called analog image information and does not allow free image processing or instantaneous transmission such as that of digital image information, which continues to develop in recent years.

Radiographic image detectors for detecting digitally processed radiographic images have emerged in recent years, as typified by computed radiography (CR) or flat panel type radiation detectors (flat panel detectors) (FPDs). These devices are able to directly obtain digitized radiographic images and directly display images on an image display device such as a cathode tube or a liquid crystal panel, so image formation on a photographic film is not absolutely necessary. As a result, these X-ray image detectors reduce the need for image formation by silver salt photography and thus dramatically improve the convenience of diagnostic operations at hospitals or medical clinics.

Computed radiography (CR) is presently accepted in healthcare settings as one type of digital technology for X-ray imaging. However, due to insufficient sharpness and spatial resolution, this technology has not reached the image quality level of screen-film systems. Flat panel detectors (FPDs) using thin film transistors (TFTs) are also being developed as even newer types of digital X-ray imaging technology, as described in the paper "Amorphous Semiconductor Usher in Digital X-ray Imaging" by John Rowlands appearing on page 24 of the November 1997 issue of the journal Physics Today or the paper "Development of a High Resolution, Active Matrix, Flat-Panel Imager with Enhanced Fill Factor" by L. E. Antonuk appearing on page 2 of 1997 Vol. 32 of the journal SPIE, for example.

In order to convert radiation to visible light, a scintillator created with an X-ray phosphor having the characteristic of emitting light in response to radiation is used, but it is necessary to use a scintillator with a high luminous efficiency in order to improve the S/N ratio in the imaging of low-dose radiation. The luminous efficiency of a scintillator is typically determined by the thickness of the phosphor layer and the X-ray absorption coefficient of the phosphor. However, as the thickness of the phosphor layer increases, the scattering of emitted light occurs within the phosphor layer, and the sharpness is diminished. By way of contrast, when the sharpness required for image quality is determined, the layer thickness is limited and the light emission luminance is reduced.

For example, in the scintillator panel disclosed in Patent Document 1, a metal reflective layer made of aluminum, an $SiO_2$ film (first dielectric layer), and a $TiO_2$ film (second dielectric layer) are laminated sequentially on a first surface of an aluminum substrate, and the entire laminate is then covered with a protective film for the reflective film over the entire aluminum substrate, to form a support. A scintillator (CsI columnar crystals or the like doped with Ti, Na, or the like) is then provided on the reflective film protective film surface on the $TiO_2$ film of the support. Since the refractive index of the $TiO_2$ film is higher than that of the $SiO_2$ film, the reflectance of light emitted from the scintillator becomes large, and the light emission luminance improves as a result.

Patent Document 2 discloses a radiographic image detector having a scintillator comprising columnar crystals made of thallium-activated cesium iodide, for example, and a photodetector on a support, the radiographic image detector being disposed so that radiation is incident sequentially in the photodetector followed by the scintillator. There is a columnar crystal region on the radiation incident side of the scintillator, and there is a non-columnar crystal region on the side opposite the incident side of the scintillator. In the columnar crystal region, there are columnar crystals yielding good light emission efficiency near the photodetector, and gaps between the columnar crystals serve to guide light and suppress light scattering. As a result, the blurring of the image is suppressed, and light reaching deep areas of the scintillator is also reflected by the non-columnar crystal region, which improves the light emission luminance.

Patent Document 3 discloses a radiographic image conversion panel having an undercoat layer and a phosphor layer on a substrate, wherein the phosphor layer consists of phosphor columnar crystals formed by vapor phase deposition from a phosphor parent compound and an activator, and the orientation of the phosphor columnar crystals based on the X-ray diffraction spectrum of a plane having a plane index of (200), for example, is within the range of from 80 to 100%, regardless of the position of the phosphor layer in the thickness direction. As a result, the derangement of the structure of the phosphor columnar crystals is prevented, and the phosphor suppresses the scattering refraction of light components emitted by X-ray irradiation and propagated in the photoelectric conversion element direction, which increases the light emission luminance of the radiographic image conversion panel.

Even if the reflectance of the reflective layer is improved as in Patent Document 1, the optical transmittance at the base of the columnar crystals is low (Patent Document 2), and the original performance cannot be derived. Therefore, the improvement in the light emission luminance cannot be considered sufficient, and although there is technology which improves the base of the columnar crystals (Patent Document 3), there remains room for improvement.

CITATION LIST

Patent Documents

Patent Document 1: Japanese Unexamined Patent Application Publication No. 2009-103676
Patent Document 2: Japanese Unexamined Patent Application Publication No. 2011-017683
Patent Document 3: WO2011/089946 A1

SUMMARY OF INVENTION

Problem to be Solved by the Invention

An object of the present invention is to provide a scintillator plate which demonstrates excellent light emission luminance while maintaining the sharpness required for image quality, and a radiation detection panel.

Solution to Problem

The problem of the present invention described above is solved by the means described below.

(1) A scintillator plate comprising an undercoat layer and a phosphor layer, wherein the phosphor layer comprises phosphor columnar crystals using the undercoat layer side as a base, and wherein when the phosphor layer is halved in terms of thickness in the lamination direction and the respective halves constitute a tip side portion and a base side portion of the phosphor columnar crystals, a ratio (B/A) of an optical transmittance (B) of the base side portion to an optical transmittance (A) of the tip side portion is at least 70%.

(2) The scintillator plate according to (1), further comprising a substrate, wherein the substrate, the undercoat layer, and the phosphor layer are laminated sequentially.

(3) A radiation detection panel comprising the scintillator plate described in (1) or (2) and a photodetector.

(4) The radiation detection panel according to (3), wherein the undercoat layer and the phosphor layer described in (1) or (2) are laminated sequentially on the photodetector.

Advantageous Effects of Invention

The present invention can provide a scintillator plate and a radiation detection panel which demonstrate high optical transmittance of the base of the phosphor columnar crystals constituting the phosphor layer while maintaining the sharpness required for image quality—that is, more emitted light reaches the undercoat layer (preferably, a metal reflective layer)—so that the loss of emitted light is reduced, resulting in excellent light emission luminance.

DESCRIPTION OF EMBODIMENTS

The present invention will be described in detail hereinafter.

<Scintillator Plate/Radiation Detection Panel>

Figure 1:
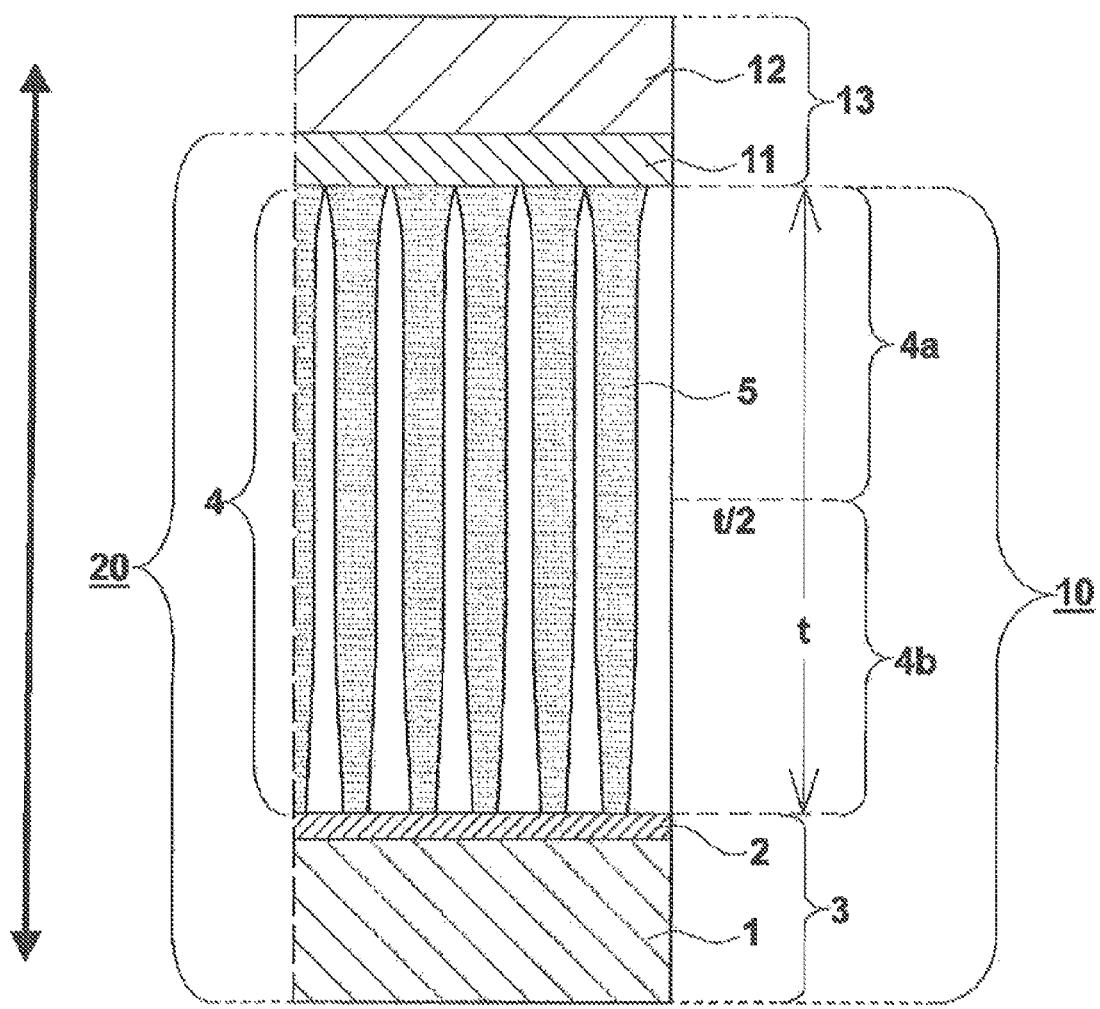
FIG. 1 is a vertical cross-sectional view schematically illustrating an embodiment of a scintillator plate (10) and a radiation detection panel (20) of the present invention. The arrows indicate the lamination direction (the direction of depositing the phosphor).

As illustrated in FIG. 1, a scintillator plate (10) of the present invention has an undercoat layer (2) and a phosphor layer (4), wherein a substrate (1), the undercoat layer (2), and the phosphor layer (4) are preferably laminated sequentially. Hereinafter, the substrate (1) and the undercoat layer (2) will be collectively described as a support (3) in the present invention.

The phosphor layer (4) according to the present invention consist of phosphor columnar crystals (5) using the undercoat layer (2) side as a base. As illustrated in FIG. 1, each of the phosphor columnar crystals (5) is narrow on the base side and tends to become thicker toward the tip side.

When the phosphor layer (4) is halved (t/2) in terms of the thickness (t) in the lamination direction and the respective halves constitute a tip side portion (4a) and a base side portion (4b) of the phosphor columnar crystals (5), the optical transmittance (B) of the base side portion (4b) to the optical transmittance (A) of the tip side portion (4a) (that is, B/A) is not less than 70% and not more than 99%.

The scintillator plate of the present invention may also have various other functional layers in addition to the undercoat layer or the phosphor layer. Examples of functional layers include a metal reflective layer (hereinafter, simply referred to as a "reflective layer"), a metal protective layer, and a phosphor protective layer.

In addition, as illustrated in FIG. 1, a radiation detection panel (20) of the present invention has the scintillator plate (10) of the present invention and a photodetector (13).

Preferred aspects of the radiation detection panel of the present invention include:

(I) an aspect in which the substrate, the undercoat layer, the phosphor layer, and the photodetector are laminated sequentially; and (II) an aspect in which the photodetector, the undercoat layer, and the phosphor layer are laminated sequentially.

In the present invention, a "phosphor" (also referred to as a "scintillator") refers to a phosphor which emits light as a result of the excitation of atoms when irradiated with ionizing radiation such as α-rays, γ-rays, or X-rays—that is, a phosphor which converts radiation to ultraviolet/visible light and discharges the light.

《Substrate》

The substrate that can be used in the present invention refers to a member fulfilling an auxiliary role of the undercoat layer to hold the phosphor layer among the constituents of the scintillator panel. In the specification of the present invention, "scintillator plate" is also referred to as "scintillator panel".

Examples of materials that can be used to constitute such a substrate include (1) carbons (amorphous carbon or a substance hardened by carbonizing charcoal and paper), (2) resins (including carbon fiber reinforced plastics (CFRP) and glass fiber reinforced plastics), (3) glasses, (4) metals, and (5) materials prepared by forming the materials of (1) to (4) described above with a thin profile and sandwiching the materials with foaming resins. One type of these materials may be used alone, or two or more types may be laminated and used.

The thickness of the substrate is preferably not less than 20 µm and not more than 3 mm.

The substrate may be provided with functional layers such as an adhesion-facilitating layer, a reflective layer, a light absorption layer, a conductive layer, a warp-preventing layer, or a smooth layer, for example.

A resin film is a preferable example of a substrate that can be used in the present invention. Using a resin film yields the following merits. (i) Functional layers such as a reflective layer, a conductive layer, or an adhesion-facilitating layer can be processed in a roll-to-roll manner. (ii) The phosphor can be easily cut into the product size before or after the vapor deposition of the phosphor. (iii) The substrate is flexible and therefore has excellent bonding with a flat light receiving element when coupling the scintillator panel and the flat light receiving element.

Examples of materials constituting such a resin film include polyethylene terephthalate, polyethylene naphthalate, cellulose acetate, polyamide resins (aramid, nylon, or the like), polyimides, polyether imides, epoxy resins, polyamide imides, bismaleimide resins, fluorine-based resins, acrylic resins, polyurethanes, polycarbonates, polyphenylene sulfides, polyether sulfones, polysalfones, polyether ether ketones, liquid crystal polymers, and carbon fiber reinforced resins. One type of these materials may be used alone, or two or more types may be laminated and used.

When vapor-depositing the phosphor on the support, the glass transition point of the support is preferably at least 100° C. so that the support does not deform due to heat. Specifically, a resin film containing a polyimide is preferable.

When a resin film is used as a substrate, the thickness of the substrate is preferably from 20 to 1,000 μm and more preferably from 50 to 750 μm. When the thickness of the substrate is at least 50 μm, the handling is improved after the phosphor layer is formed. When the thickness of the substrate is not more than 750 μm, it becomes easy to process functional layers such as a reflective layer, a conductive layer, or an adhesion-facilitating layer in a roll-to-roll manner, which is extremely useful from the perspective of improving productivity.

In addition, the substrate is preferably a "substrate with flexibility" having a modulus of elasticity of from 0.1 to 20 GPa. In the present invention, the "modulus of elasticity" is a value determined by finding the slope of stress to the amount of strain in a region where the strain indicated by a reference line of a sample in accordance with JIS C 2318 and the corresponding stress demonstrate a linear relationship using a tension tester. This is a value also called the Young's modulus, and the Young's modulus is defined as the modulus of elasticity in the present invention.

A rigid plate with a modulus of elasticity of at least 10 GPa, in particular, may be used as the substrate. For example, a rigid plate made of metal, glass, carbon, or a composite material thereof may be used without any particular limitations.

A warp-preventing layer may be provided on the substrate in order to prevent the warping of the scintillator panel. The warping of the scintillator panel can be suppressed by attaching or coating a material with different thermal expansion characteristics or different thermal contraction characteristics, for example, onto the substrate.

《Reflective Layer》

A reflective layer is preferably formed on the surface of the substrate on at least the side on which the phosphor layer is vapor-deposited. When a reflective layer is provided, it is possible to very efficiently extract emitted light from the phosphor layer, which may lead to dramatic improvements in the light emission luminance of the scintillator plate.

The surface reflectance of the reflective layer is preferably at least 80%, and more preferably at least 90%.

Examples of materials constituting the reflective layer include metals and materials in which light scattering particles are dispersed in a binder.

Materials such as aluminum, silver, platinum, palladium, gold, copper, iron, nickel, chrome, cobalt, and stainless steel, for example, are preferable examples of metals constituting the reflective layer. Of these materials, it is particularly preferable to use aluminum or silver as the main component from the perspectives of reflectance and corrosion resistance. Two or more of such thin metal layers may also be laminated.

The method of coating the substrate with the metal material is not particularly limited and may be vapor deposition, sputtering, metal foil attachment, or the like, but sputtering is preferable from the perspective of the bonding of the substrate and the reflective layer.

The thickness of the reflective layer is preferably from 0.005 to 0.3 μm and more preferably from 0.01 to 0.2 μm, which is preferable from the perspective of the emitted light extraction efficiency.

In addition, in the present invention, reflection-enhancing layer made of a metal oxide such as $SiO_2$ or $TiO_2$ may be further provided to improve the reflectance.

A reflective layer in which light scattering particles are dispersed in a binder is as follows.

White pigments such as $TiO_2$ (anatase type, rutile type), MgO, $PbCO_3$—$Pb(OH)_2$, $BaSO_4$, $Al_2O_3$, M(II)FX (where M(II) is at least one type of atom selected from Ba, Sr, and Ca, and X is a Cl atom or a Br atom), $CaCO_3$, ZnO, $Sb_2O_3$, $SiO_2$, $ZrO_2$, lithopone ($BaSO_4$—ZnS), magnesium silicate, basic silicosulfate, basic lead phosphate, and aluminum silicate, for example, can be used as light scattering particles. Since these white pigments have excellent opacifying strength and a large refractive index, the emitted light of the scintillator can be easily scattered by reflecting or refracting light, which makes it possible to markedly improve the sensitivity of the resulting radiographic image conversion panel.

Examples of other light scattering particles that can be used include glass beads, resin beads, hollow particles with hollow parts inside particles, multi-hollow particles with multiple hollow parts inside particles, and porous particles.

One type of these substances may be used alone, or two or more types may be used in combination.

Either a rutile type or anatase type structure may be used as the crystal structure of titanium oxide ($TiO_2$), but a rutile type structure is preferable from the perspective that the ratio of the refractive index to that of the resin is large and that high luminance can be achieved.

Specific examples of titanium oxides include CR-50, CR-50-2, CR-57, CR-80, CR-90, CR-93, CR-95, CR-97, CR-60-2, CR-63, CR-67, CR-58, CR-58-2, and CR-85 produced by a hydrochloric acid method, for example; and R-820, R-830, R-930, R-550, R-630, R-680, R-670, R-580, R-780, R-780-2, R-850, R-855, A-100, A-220, and W-10 produced by a sulfuric acid method (the above are product names of products produced by Ishihara Sangyo Kaisha, Ltd.).

The primary particle size of the titanium oxide is preferably from 0.1 to 0.5 μm and more preferably from 0.2 to 0.3 μm.

A substance surface-treated with an oxide consisting of Al, Si, Zr, Zn, or the like, for example, is particularly preferable as a titanium oxide from the perspectives of affinity with polymers as a binder, the improvement of dispersibility, and the suppression of polymer deterioration.

Examples of the material mixed with the light scattering particles to form the reflective layer (that is, a binder) include adhesion-facilitating polymers such as polyurethanes, vinyl chloride copolymers, vinyl chloride-vinyl acetate copolymers, vinyl chloride-vinylidene chloride copolymers, vinyl chloride-acrylonitrile copolymers, and butadiene-acrylonitrile copolymers, polyamide resins, polyvinyl butyral, polyesters, cellulose derivatives (nitrilocellulose and the like), styrene-butadiene copolymers, various synthetic rubber resins, phenol resins, epoxy resins, urea resins, melamine resins, phenoxy resins, silicone resins, acrylic resins, and urea formamide resins. Of these materials, polyurethanes, polyesters, silicone resins, acrylic resins, and polyvinyl butyral are preferable. One type of these binders may be used alone, or two or more types may be mixed.

A coating-type reflective layer can be formed by applying and drying a composition containing at least light scattering particles, a binder, and a solvent. The coating method is not particularly limited, and a typical method such as gravure coating, die coating, comma coating, bar coating, dip coating, spray coating, or spin coating, for example, may be used.

Examples of the solvent used to form the reflective layer include lower alcohols such as methanol, ethanol, n-propanol, and n-butanol; chlorine atom-containing hydrocarbons such as methylene chloride and ethylene chloride; ketones such as acetone, methyl ethyl ketone, and methyl isobutyl ketone; aromatic compounds such as toluene, benzene, cyclohexane, cyclohexanone, and xylene; esters of lower fatty acids and lower alcohols such as methyl acetate, ethyl acetate, and butyl acetate; ethers such as dioxane, ethylene glycol monoethyl ester, ethylene glycol monomethyl ester, methoxypropanol propylene glycol monomethyl ether, and propylene glycol monomethyl ether acetate; and mixtures thereof.

A dispersing agent may also be used to improve the dispersibility of the titanium oxide. Polyhydric alcohols, amines, silicones, surfactants, or the like, for example, may be used as the dispersing agent.

The thickness of the reflective layer is preferably from 10 to 500 µm. Sufficient luminance can be achieved when the thickness of the reflective layer is at least 10 µm, and the smoothness of the reflective layer surface improves when the thickness is not more than 500 µm.

Titanium oxide is preferably contained at a volume of from 40 to 95 wt. % and is more preferably contained at a volume of from 60 to 90 wt. % in the reflective layer. The luminance improves when the amount is at least 40 wt. %, and the adhesiveness with the substrate or the phosphor layer improves when the amount is not more than 95 wt. %.

In the present invention, preferably, an intermediate layer is provided between the substrate and the reflective layer to improve the bonding of the substrate and the reflective layer. In addition to typical adhesion-facilitating polymers, metal layers made of different materials than the reflective layer may be provided as the material constituting the intermediate layer. Such a metal layer of a different type is preferably formed using at least one type of metal selected from the group consisting of nickel, cobalt, chrome, palladium, titanium, zirconium, molybdenum, and tungsten, for example. Of these, it is more preferable to use one type nickel or chrome alone or as a combination of two or more types.

《Undercoat Layer》

The undercoat layer serves as a foundation of the phosphor columnar crystals in the scintillator plate of the present invention. If the undercoat layer is hard, it is unnecessary to use the substrate described above, but as long as the undercoat layer is flexible, the substrate can be used supplementarily. In the latter case, the undercoat layer can also improve the adhesiveness between the substrate and the phosphor layer.

When the phosphor layer is formed by vapor phase deposition such as vapor deposition, the foundation portion of the phosphor layer (portion grounded to the undercoat layer of the phosphor columnar crystals) often ordinarily consists of an aggregate of spherical crystals several µm in diameter. However, the polymer binder forming the undercoat layer preferably consists of a polymer having a melting point (Tm) or a glass transition point (Tg) of not more than 300° C. As a result, the undercoat layer remains flexible even at low temperatures, so it is difficult for the spherical crystal nuclei to move, which makes it difficult for the spherical crystals to aggregate. Adjacent phosphor columnar crystals which stand and grow together are unlikely to make contact with one another (including aspects with partial bonding or deposition), which is preferable from the perspective of light guiding.

A specific example of the material constituting the undercoat layer is an adhesion-facilitating polymer—that is, a polymer binder (binder). Examples include polyurethanes, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, aramid and nylon, polyvinyl butyral, polyesters, cellulose derivatives (nitrocellulose and the like), styrene-butadiene copolymers, various synthetic rubber resins, phenol resins, epoxy resins, urea resins, melamine resins, phenoxy resins, silicone resins, acrylic resins, and urea formamide resins. Of these materials, polyurethanes, polyesters, silicone resins, acrylic resins, polyvinyl butyral, and polyparaxylylene resins are preferable. One type of these binders may be used alone, or two or more types may be mixed.

It is preferable for the glass transition point (Tg) of the binder to be not more than 100° C. from the perspective of improving the adhesiveness between the substrate and the phosphor layer. A material having a melting point is preferable from the perspective of improving the adhesiveness between the substrate and the phosphor layer since the melting point in an environment at normal pressure is not more than 300° C.

Examples of the method for forming the undercoat layer include methods of forming the undercoat layer by coating and drying a polymer binder dissolved or dispersed in a solvent and methods of forming a polyparaxylylene resin film by a chemical vapor deposition (CVD) method.

The coating method of the undercoat layer is not particularly limited, and a typical method such as gravure coating, die coating, comma coating, bar coating, dip coating, spray coating, or spin coating, for example, may be used.

Examples of solvents that can be used in the preparation of the undercoat layer include lower alcohols such as methanol, ethanol, n-propanol, and n-butanol; chlorine atom-containing hydrocarbons such as methylene chloride and ethylene chloride; ketones such as acetone, methyl ethyl ketone, and methyl isobutyl ketone; aromatic compounds such as toluene, benzene, cyclohexane, cyclohexanone, and xylene; esters of lower fatty acids and lower alcohols such as methyl acetate, ethyl acetate, and butyl acetate; ethers such as dioxane, ethylene glycol monoethyl ester, ethylene glycol monomethyl ester, methoxypropanol propylene glycol monomethyl ether, and propylene glycol monomethyl ether acetate; and mixtures thereof.

The thickness of the undercoat layer is preferably from 0.1 to 10 µm and more preferably from 0.5 to 5 µm. When the thickness of the undercoat layer is at least 0.5 µm, the adhesiveness with the phosphor layer improves, and when the thickness of the undercoat is not more than 5 µm, the scattering of light in the undercoat layer is suppressed and the sharpness improves.

A pigment, dye, or the like may also be included in the undercoat layer in order to improve the sharpness or the like by preventing the scattering of light emitted by the phosphor (scintillator).

《Phosphor Layer》

In the present invention, the phosphor layer preferably consists of columnar crystals obtained by vapor phase deposition and may be formed from a plurality of layers. In the process of forming the phosphor columnar crystals, the layer is divided into a first phosphor layer formed until the phosphor columnar crystal growth reaches a film thickness of approximately 50 μm and a second phosphor layer for all other areas. The first phosphor layer, in particular, is also referred to as the "foundation layer". The material forming the phosphor layer is referred to as a "phosphor material" or simply a "phosphor" and refers to only the phosphor parent compound or a composition consisting of the phosphor parent compound and an activator.

Various phosphor materials are known as materials for forming a phosphor layer, but cesium iodide (CsI) is preferable in that the conversion rate from X-rays to visible light is comparatively high, and the phosphor can be easily formed into a columnar crystal structure by vapor deposition. Therefore, the scattering of emitted light within the crystals is suppressed by the light guiding effect, so the phosphor layer may be made to be thick.

Various activators may be added for the purpose of further improving the light emission efficiency of the phosphor layer consisting of only CsI. For example, Japanese Examined Patent Application Publication No. S54-35060 describes a material in which CsI and sodium iodide (NaI) are mixed at a given molar ratio. In addition, it is described in Japanese Unexamined Patent Application Publication No. 2001-59899 that CsI containing an activating substance such as thallium (Tl), Europium (Eu), indium (In), lithium (Li), potassium (K), rubidium (Rb), or sodium (Na) is preferable.

In the present invention, it is preferable to use an additive containing at least one type of thallium compound and cesium iodide as the phosphor material. In particular, thallium-activated cesium iodide (CsI:Tl) is preferable due to the wide range of light emission wavelengths of from 400 to 750 nm.

Various thallium compounds (compounds with oxidation numbers of +I and +III) can be used as the thallium compound of the additive containing at least one type of thallium compound. Examples include thallium iodide (TlI), thallium bromide (TlBr), thallium chloride (TlCl), thallium fluoride (TlF), and (TlF$_3$).

In the present invention, a preferable thallium compound is thallium iodide (TlI), and the melting point of the thallium compound is preferably within the range of from 400 to 700° C. When the melting point is not more than 700° C., the additives in the columnar crystals are distributed uniformly, and the light emission efficiency improves. In the present invention, the melting point refers to the melting point at normal temperature and normal pressure.

The relative content of the activator in the phosphor layer is preferably from 0.1 to 5 mol %. Within the phosphor layer, the relative content in the foundation layer is preferably from 0.01 to 1 mol % and more preferably from 0.1 to 0.7 mol %. The relative content of the activator is expressed as the mol % of the activator to 1 mol of the phosphor parent compound. In particular, it is important for the substrate layer to contain at least 0.01 mol % from the perspective of the improvement of light emission luminance and storage stability.

In the present invention, the relative content of the activator in the foundation layer is preferably lower than the relative content in the phosphor layer, and the ratio of the relative content of the activator in the foundation layer to the relative content of the activator in the phosphor layer (that is, (relative content of activator in foundation layer)/(relative content of activator in phosphor layer)) is preferably from 0.1 to 0.7.

The orientation of the phosphor layer based on the X-ray diffraction spectrum of a surface having a certain plane index is preferably within the range of from 80 to 100%, regardless of the position in the layer thickness direction. For example, the plane index in thallium-activated cesium iodide (CsI:Tl) may be (100), (110), (111), (200), (211), (220), or (311), for example. Of these, the plane index is preferably (200). See pages 42 to 46 of Introduction to X-ray Analysis (Tokyo Kagaku Dojin) regarding the plane index.

In the present invention, the "orientation based on the X-ray diffraction spectrum of a surface having a certain plane index" refers to the percentage that the intensity Ix of a certain plane index occupies out of the total intensity I including planes of other plane indices. For example, the orientation of a (200) plane with an intensity of $I_{200}$ in the X-ray diffraction spectrum is "orientation=$I_{200}$/I". An example of a method for measuring the plane index for determining the orientation is X-ray diffraction (XRD). X-ray diffraction is a highly versatile analytical method with which knowledge related to the identification of a substance or the structure of a crystal phase can be obtained by utilizing the fact that diffraction satisfying the Bragg formula occurs when a crystalline substance is irradiated with characteristic X-rays of a specific wavelength. Cu, Fe, Co, or the like is used as the target of the irradiation system, and although dependent on the device capacity, the output at the time of irradiation is typically from approximately 0 to 50 mA and from 0 to 50 kV.

The phosphor layer preferably consists of columnar crystals in which the scattering of emitted light within the crystals is suppressed by the light guiding effect. Vapor phase deposition may be used as the method for forming columnar crystals. Examples of types of vapor phase deposition that can be used include vapor deposition, sputtering, CVD, and ion plating, but vapor deposition is particularly preferable in the present invention.

The phosphor layer preferably consists of a phosphor comprising a phosphor parent compound and an activator. More preferably, the foundation layer comprises a phosphor parent compound and an activator so that the porosity yields a higher value than the phosphor layer.

In order to satisfy the plane index requirements described above, the method for forming the phosphor columnar crystals preferably includes a step of forming a foundation layer demonstrating a higher porosity value than the phosphor layer on the surface of an undercoat layer and a step of forming a phosphor on the surface of the foundation layer by vapor phase deposition.

In the present invention, "porosity" refers to the ratio of the area of voids to the sum of the cross-sectional area of the columnar crystals and the area of the voids in a cross-section in which the phosphor layer is cut parallel to the support and can be found by cutting out the phosphor layer of the scintillator plate parallel to the support and binarizing the phosphor portion and the void part of a scanning electron microscope photograph of the cross section using image processing software.

The thickness of the phosphor layer is preferably from 100 to 800 μm and is more preferably from 120 to 700 μm in that the characteristics of luminance and sharpness can be achieved with good balance.

The thickness of the foundation layer is preferably from 0.1 to 50 μm and more preferably from 5 to 40 μm from the perspective of maintaining high luminance and sharpness.

The phosphor columnar crystals contained in the phosphor layer are preferably such that the average equivalent circle diameter (a) at a position 10 μm from the starting point side of crystal growth and the average equivalent circle diameter (b) of the outermost surface satisfies a relationship such that $1.5 \le b/a \le 30$.

The thickness (c) of the foundation layer and the thickness (d) of the second phosphor layer preferably satisfy a relationship such that 3≤d/c≤1,000 from the perspective of sharpness but even more preferably satisfy 10≤d/c≤1,000.

《Phosphor Protective Layer》

The main focus of the phosphor protective layer (hereinafter, simply referred to as a "protective layer"), which is one type of functional layer that the scintillator plate of the present invention may have, is to physically or chemically protect the phosphor layer. That is, cesium iodide (CsI), which has high hygroscopicity, absorbs water vapor in the air and deliquesces when left exposed, so the purpose of the phosphor protective layer is to prevent this from occurring.

It is preferable to include a step of forming a protective layer on the phosphor layer after the scintillator plate of the present invention is produced and before the step of cutting the scintillator plate into a prescribed size. The protective layer is also a layer for further enhancing damage prevention so as to prevent damage such as crystal cracking of the columnar crystals of the phosphor layer at the time of cutting in the cutting step. The protective layer also has an aspect of being able to prevent corrosion on the light receiving element side due to contact between the scintillator and the light receiving element. When coupling a phosphor layer consisting of phosphor columnar crystals and a photodetector such as a photoelectric element with an optical compensation material, this protective layer also fulfills the roll of a penetration prevention layer for preventing the optical compensation material from penetrating between the columnar crystals.

The protective layer can be formed, for example, by laminating inorganic substances such as SiC, $SiO_2$, SiN, and $Al_2O_3$ by vapor deposition, sputtering, or the like. The protective layer may also be formed by directly coating the surface of the phosphor layer with a coating solution for the protective layer, and a protective layer formed separately in advance may also be attached to the phosphor layer. The thickness of the protective layer is preferably from 0.1 to 2,000 μm.

The protective layer may also be formed from a polymer material such as a polyolefin-based polymer, a polyacetal-based polymer, an epoxy-based polymer, a polyimide-based polymer, a silicone-based polymer, or a polyparaxylylene-based polymer, for example.

When the protective layer is formed from a polyparaxylylene-based polymer material, the protective layer is preferably formed by CVD with a thickness of not less than 1 μm and not more than 20 μm, and when formed from other polymer materials, the protective layer is preferably formed by coating with a thickness of not less than 1 μm and not more than 100 μm.

Polyparaxylylene-based polymer materials also have the characteristic of low water vapor and gas permeability and are originally suitable for a deliquescent CsI:Tl protective film. Here, in addition to polyparaxylylene, polyparaxylylenes include polymonochloroparaxylylene, polydichloroparaxylylene, polytetrachloroparaxylylene, polyfluoroparaxylylene, polytetrachloroparaxylylene, polyfluoroparaxylylene, polydimethylparaxylylene, and polydiethylparaxylylene.

In the present invention, an adhesive layer used for adhesion with a planar light receiving element may also be present on the protective layer. The thickness of the adhesive layer is preferably at least 10 μm from the perspective of ensuring adhesive force, and the sum of the thickness of the protective layer and the thickness of the adhesive layer is not more than 100 μm and more preferably not more than 50 μm. This is preferable in that it is possible to prevent the sharpness of the flat panel detector from diminishing due to an increase in the diffusion of light emitted from the scintillator in the gaps between the planar light receiving element and the scintillator panel.

A protective layer of another aspect may be formed using a hot-melt resin. The hot-melt resin can also serve as an adhesive between the scintillator plate and the planar light receiving element surface.

The hot-melt resin of the present invention is an adhesive resin made of a nonvolatile thermoplastic material which does not contain water or a solvent and is a solid at room temperature. The hot-melt resin melts when the resin temperature increases and solidifies when the resin temperature decreases. The hot-melt resin is also adhesive in the heat melted state and assumes a solid state at normal temperature so as not to have adhesiveness.

A suitable hot-melt resin is one with a main component of a polyolefin-based resin, a polyester-based resin, or a polyamide-based resin, but a polyolefin-based resin is preferable from the perspective of optical transmittance.

The thickness of a protective layer consisting of a hot-melt resin is preferably not more than 20 μm.

In addition, the melting initiation temperature of the hot-melt resin is preferably not less than 60° C. and not more than 150° C. from the perspectives of continuous usability and adhesive peeling resistance in a planar light receiving element such as a TFT. The melting initiation temperature of the hot-melt resin can be adjusted by adding a plasticizer.

The methods described below are examples of method for forming a protective layer from a hot-melt resin.

Method of preparing a release sheet coated with a release agent, applying a hot-melt resin to the release sheet, disposing the hot-melt resin surface on the phosphor layer surface of the scintillator panel, attaching the surfaces while applying pressure with a heated roller, and removing the release sheet after cooling.

Alternatively, a method of disposing a sheet coated with a hot-melt resin on the phosphor layer surface, placing resin films above and below the sheet and the phosphor layer, sealing the periphery of the upper and lower resin films under reduced pressure, and then overheating at atmospheric pressure.

An example of a suitable resin film in the latter method is a dry laminate film consisting of a sealant film and polyethylene terephthalate (PET), which is preferable in that uniform adhesion pressure is achieved at atmospheric pressure over the entire phosphor layer.

The present inventors discovered that when a rigid substrate such as carbon, aluminum, or glass is used, the scintillator plate can be cut by blade dicing into a prescribed size without causing cracks in the crystals by forming a protective layer such as a polyparaxylylene or a hot-melt resin on the phosphor layer surface. The blade dicing described in the present invention refers to cutting using a blade typically used for the dicing of silicon wafers or the like, but laser dicing can also be used when the substrate is made of glass.

High moisture resistance can be achieved by covering the top part and the side surfaces of the phosphor layer as well as the periphery of the phosphor layer of the undercoat layer (preferably, the substrate) with a polyparaxylylene. The hot-melt resin not only has moisture resistance but also provides adhesiveness between the scintillator panel and the planar light receiving element surface.

From the perspective of impact resistance, a substance that can form a resin layer that penetrates between the phosphor columnar crystals to a certain degree, such as a polyparaxylylene or a hot-melt resin is preferable. On the other hand, from the perspective of sharpness, a substance that can form a resin layer that does not significantly penetrate between the phosphor columnar crystals is preferable.

In addition, as a protective layer of another aspect, a polymer film (also referred to as a protective film) may also be formed on the phosphor layer. The same type of film as the polymer film serving as the material of the substrate described above can be used as the material of the polymer film.

The thickness of the polymer film is preferably from 12 to 120 μm and more preferably from 20 to 80 μm when taking into consideration the formability of the void part and the protection of the phosphor layer, sharpness, moisture resistance, operationality, and the like.

The haze ratio is preferably from 3 to 40% and more preferably from 3 to 10% when taking into consideration the sharpness, radiographic image irregularities, production stability, and operationality. The haze ratio represents a value measured with an NDH 5000 W made by Nippon Denshoku Industries Co., Ltd. A polymer film with the required haze ratio can be selected appropriately from commercially available polymer films and can be easily acquired.

The optical transmittance of the protective film is preferably at least 70% at 550 nm when taking into consideration the photoelectric conversion efficiency, the phosphor (scintillator) light emission wavelength, and the like, but since films with optical transmittance of 99% or higher are difficult to obtain industrially, a range of from 99 to 70% is substantially preferable.

The water vapor permeability of the protective film (40° C., 90% RH) (measured in accordance with JIS Z0208) is preferably not more than 50 g/m$^2$-day and more preferably not more than 10 g/m$^2$-day when taking into consideration the protection, the deliquescence, or the like of the phosphor layer. However, since films with a water vapor permeability of 0.01 g/m$^2$-day or less are difficult to obtain industrially, the water vapor permeability is substantially preferably not less than 0.01 g/m$^2$-day and not more than 50 g/m$^2$-day and more preferably not less than 0.1 g/m$^2$-day and not more than 10 g/m$^2$-day.

《Photodetector》

As illustrated in FIG. 1, the photodetector (13) preferably has a photoelectric conversion element array (11) and a circuit board (12).

The photoelectric conversion element array is an array in which photoelectric conversion elements (or planar light receiving elements) consisting of photosensors and thin film transistors (TFTs) or charge coupled devices (CCDs) are arranged two-dimensionally. The circuit board outputs charges converted from light emitted from the phosphor layer by the photoelectric conversion elements as electrical signals and also fulfills the role of a foundation for the photoelectric conversion element array.

In FIG. 1, the photodetector (13) consisting of the circuit board (12) and the photoelectric conversion element array (11) is laminated so as to face the phosphor layer (4) side of the scintillator plate (10) so that the radiation detection panel (20) of the present invention is formed. However, a phosphor protective layer is preferably provided between the photoelectric conversion element array (11) and the phosphor layer (4) so that the photoelectric conversion element array (11) and the phosphor protective layer are adhered (attached) or make close contact with one another.

In FIG. 1, the phosphor layer (4) is formed by phosphor columnar crystals (5) using the undercoat layer (2) side as a base, but the phosphor layer (4) may also be formed by phosphor columnar crystals (5) using the photoelectric conversion element array (11) side as a base. That is, the phosphor layer (4) may be formed by growing phosphor columnar crystals (5) by vapor phase deposition using the photodetector (13) as a substrate or a support.

The average surface roughness (Ra) of the outermost surface facing the phosphor layer of the photoelectric conversion element array is preferably from 0.001 to 0.5 μm, more preferably from 0.001 to 0.1 μm, and even more preferably from 0.001 to 0.05 μm. After the circuit board and the photoelectric conversion element array are sequentially formed on a flat surface made of glass or the like, a flattening layer made of an organic resin consisting of a polyester or acrylic resin, for example, is formed on the photoelectric conversion element array surface, and the surface roughness can be controlled by photoetching so as to adjust the surface roughness to satisfy the range of Ra described above.

The radiation detection panel of the present invention is preferably of a form in which the scintillator plate is pressed against the photoelectric conversion element array by an elastic member (such as a sponge or a spring, for example) so as to make close contact. It is also preferable for the gaps between the scintillator plate and the photoelectric conversion element array to closely overlap with one another due to depressurization and for the peripheries thereof to be sealed by a hermetic sealing member or the like. The hermetic sealing member preferably consists of a UV-curing resin composition.

The UV-curing resin is not particularly limited and can be selected appropriately from conventionally used resins. This UV-curing resin composition contains a photopolymerizable prepolymer or a photopolymerizable monomer and a photopolymerization initiator or a photosensitizer.

Examples of photopolymerizable prepolymers include polyester acrylates, epoxy acrylates, urethane acrylates, and polyol acrylates. Of these prepolymers, urethane acrylates are preferable. One type of these photopolymerizable prepolymers may be used alone, or two or more types may be used in combination.

Example of photopolymerizable monomers include polymethylolpropane tri(meth)acrylate, hexanediol(meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth) acrylate, and neopentylglycol di(meth)acrylate. Of these, dipentaerythritol hexa(meth)acrylate or the like is preferable.

Examples of photopolymerization initiators include acetophenones, benzophenones, α-amidoxime esters, tetramethylthiuram monosulfide, and thioxanthones.

As a photosensitizer, an n-butylamine, triethylamine, poly-n-butylphosphine, and the like can be mixed and used.

《Optical Compensation Layer》

In the present invention, the optical compensation layer is a layer which is preferably formed from an optical compensation material when coupling the phosphor layer consisting of phosphor columnar crystals and a photodetector such as a photoelectric element using an optical compensation material.

With the indirect conversion type scintillator plate and radiation detection panel of the present invention, the difference between the refractive indices of the phosphor columnar crystals serving as a scintillator and the optical compensation layer and the difference between the refractive indices of the optical compensation layer and the flattening layer become small. Thus, the degree to which light emitted within the phosphor layer by irradiated radiation is reflected on the boundary surface between the phosphor columnar crystals and the optical compensation layer or the boundary surface between the optical compensation layer and the flattening layer becomes small. Therefore, since the degree to which light emitted within the phosphor layer is reflected in the planar direction is reduced, the reception of light by photoelectric conversion elements other than those directly beneath the phosphor layer is suppressed. In addition, reflected light can be reliably prevented from being absorbed by the phosphor or the like. Therefore, practically, the entire amount of light is precisely incident on the photoelectric conversion elements directly beneath the phosphor layer, which makes it possible to obtain radiographic images with high sensitivity and sharpness.

Therefore, in the present invention, the optical compensation layer is preferably formed from a heat-curable resin. Examples of preferably used heat-curable resins include acrylic resins, epoxy resins, and silicone resins.

The method for forming an optical compensation layer by curing a heat-curable resin will be described in the production method of the scintillator plate and the like described below.

In addition, the optical compensation layer can also be formed from a transparent liquid or gel-like substance instead of a solid such as a cured resin. In this case as well, an optical compensation layer consisting of a liquid or a gel-like substance can be formed in a state in close contact with at least each tip portion of the phosphor columnar crystals of the scintillator plate and the surface of the flattening layer, respectively.

Examples of materials that can be used to form the optical compensation layer include normal temperature-curable adhesives such as acrylic adhesives, epoxy adhesives, and silicone adhesives.

In particular, a rubber adhesive can be used as a material having elasticity for forming the optical compensation layer. Examples of rubber adhesive resins that can be used include block copolymers such as styrene-isoprene-styrene, synthetic rubber adhesives such as polybutadiene or polybutylene, and natural rubbers. A suitable example of a commercially available rubber adhesive is an RTV rubber KE420 one-component adhesive (produced by Shin-Etsu Chemical Co., Ltd.).

An adhesive optical grease or the like may also be used between the scintillator plate and the planar light receiving element. Any well-known product may be used as long as the product has high transparency and adhesiveness. A suitable example of a commercially available optical grease is a KF96H silicone oil (100 million CS: produced by Shin-Etsu Chemical Co., Ltd.).

On the other hand, the optical compensation layer is preferably formed so that the refractive index thereof not less than the smaller refractive index and not more than the greater refractive index of the refractive indexes of the phosphor layer of the scintillator plate and the flattening layer.

In the present invention, as described above, CsI:Tl, for example, is used as the phosphor columnar crystals of the scintillator plate, and the refractive index thereof is approximately 1.8. An acrylic resin, for example, is used as the material for forming the flattening layer, and the refractive index thereof is approximately 1.5. Therefore, in the present invention, the optical compensation layer is formed so that the refractive index n thereof is within the range of from 1.5 to 1.8.

The optical compensation layer is preferably transparent so as to ensure that light emitted in the phosphor layer of the scintillator plate due to the irradiation of radiation reaches the photoelectric conversion elements via the optical compensation layer or the flattening layer and has a high optical transmittance of at least 90%.

In addition, if the resin forming the optical compensation layer readily contracts when cured or readily expands when the temperature increases, a force is applied to the phosphor columnar crystals of the scintillator plate in the planar direction when the optical compensation layer contracts or expands. The possibility that the columnar crystals will be damaged by this force thus arises. Therefore, it is preferable to use a resin with a low curing contraction rate or a low coefficient of linear expansion as the resin forming the optical compensation layer.

In order to make the curing of the adhesive more reliable, the scintillator plate may be further heated after being irradiated with ultraviolet rays as described above and then subjected to treatment such as the calcination of the adhesive. At this time, the heat-curable resin forming the optical compensation layer is preferably formed from a material having a higher glass transition point than the glass transition point of the adhesive so that the optical compensation layer formed by curing the heat-curable resin does not undergo glass transition at the time of the calcination of the adhesive.

When an optical compensation layer is formed by curing a resin in this state, the optical compensation layer has the effect of reducing the percentage of light reflected on the boundary surface, as mentioned above. As a result, the percentage of light reflected at the side walls of the columnar crystals is reduced, and light tends to leak to the outside of the phosphor columnar crystals. When light leaks out from the columnar crystals, the light emitted within the phosphor layer of the scintillator panel is diffused in the planar direction, which ultimately leads to the problem that the sharpness of the resulting radiographic image is not high.

Therefore, for example, during or after the application of the resin serving as the optical compensation layer, it is possible to increase the viscosity of the resin or use a resin having a viscosity that does not allow the resin to penetrate between the respective phosphor columnar crystals due to the capillary phenomenon.

<Production Method>

The production method of the scintillator panel and the radiation detection panel of the present invention preferably includes a step of installing a support on a support rotating mechanism and vapor-depositing a phosphor material by vapor phase deposition while rotating the support using a vapor deposition device having an evaporation source and a support rotating mechanism inside a vacuum chamber.

In addition to such a "vapor deposition step", the production method of the present invention may also include steps such as the aforementioned "step of forming an undercoat layer on the substrate", a "step of heating after vapor deposition", a "step of forming a phosphor protective layer", and a "step of forming an optical compensation layer".

《Vapor Deposition Step》

The production method of the scintillator panel of the present invention will be described hereinafter with reference to FIG. 2.

Evaporation sources (38) are disposed at positions facing one another on the periphery of a circle centered on a central line perpendicular to a support (3) in the vicinity of the bottom surface inside a vacuum chamber (32). In this case, the spacing between the support (3) and the evaporation sources (38) is preferably from 100 to 1,500 mm and more preferably from 200 to 1,000 mm. In addition, the spacing between the central line perpendicular to the support (3) and the evaporation sources (38) is preferably from 100 to 1,500 mm and more preferably from 200 to 1,000 mm.

In a vapor deposition device (31) suitable for the scintillator panel of the present invention, three or more evaporation sources (for example, 8, 16, or 24 evaporation sources) can be provided. The respective evaporation sources may be disposed with equal spacing or with varied spacing. The radius of the circle centered on the central line perpendicular to the support (3) can be determined as desired.

The evaporation sources (38) house phosphors and heat them by resistance heating, so the evaporation sources (38) may be formed from crucibles made of alumina wrapped with heaters, boats or heaters made of high-melting-point metals. In addition to resistance heating, method for heating the phosphor may be a method such as heating by an electron beam or heating by radio frequency induction, but it is preferable to use a method of resistance-heating by applying a direct current or resistance-heating the crucible indirectly with a peripheral heater from the perspective that the present invention becomes a comparatively simple configuration, easy to handle and inexpensive and can be applied to a very large range of substances. The evaporation sources (38) may also be molecular beam sources using a molecular source epitaxial method.

With the vapor deposition device (31) or the production method described above, a portion in which the water vapor currents of the evaporation sources (38) overlap is rectified by providing a plurality of evaporation sources (38), which makes it possible to make the crystallinity of the phosphor vapor-deposited on the surface of the support (3) uniform. At this time, the water vapor currents are rectified at more locations when more evaporation sources are provided, so the crystallinity of the phosphor can be made uniform over an even wider range. By disposing the evaporation sources (38) on the periphery on a circle centered on the central line perpendicular to the support (3), the effect that the crystallinity is made uniform by the rectification of the water vapor currents can be achieved isotropically on the surface of the support (3).

A support holder (35) is configured to hold the support (3) so that the surface of the support (3) forming the phosphor layer (4) faces the bottom surface of the vacuum chamber (32) and is parallel to the bottom surface of the vacuum chamber (32).

It is preferable to provide a heating heater (not illustrated) for heating the support (3) on the support holder (35). By heating the support (3) with this heating heater, the bonding of the support (3) with the support holder (35) is reinforced and the film properties of the phosphor layer (4) are adjusted. In addition, an impurity layer is prevented from generating between the surface of the support (3) and the phosphor by separating and removing any absorbates on the surface of the support (3).

A mechanism for circulating a warm or heat medium (not illustrated) may also be provided as a heating means. This means is suited to cases in which the temperature of the support (3) at the time of the vapor deposition of the phosphor is held at a relatively low temperature of from 50 to 150° C. to perform vapor deposition.

In addition, a halogen lamp (not illustrated) may also be provided as a heating means. This means is suited to cases in which the temperature of the support (3) at the time of the vapor deposition of the phosphor is held at a relatively high temperature of at least 150° C. to perform vapor deposition.

Further, the support holder (35) is provided with a support rotating mechanism (36) for rotating the support (3) in the horizontal direction. The support rotating mechanism (36) comprises a support rotary shaft (37) for supporting the support holder (35) and rotating the support (3) and a motor (not illustrated) which is disposed on the outside of the vacuum chamber (32) and serves as a driving source for the support rotary shaft (37).

In addition to the configuration described above, a vacuum pump (33) is disposed in the vacuum chamber (32) of the vapor deposition device (31). The vacuum pump (33) is for discharging the gas inside the vacuum chamber (32), and two or more types of vacuum pumps with different operating pressure ranges may be disposed in order to discharge gases up to a high vacuum range. A rotary pump, a turbo molecular pump, a cryo-pump, a diffusion pump, a mechanical booster, or the like, for example, can be used as the vacuum pump (33).

In order to adjust the pressure inside the chamber, a mechanism capable of introducing a gas into the vacuum chamber (32) is provided (not illustrated). The introduced gas that is used is typically an inert gas such as Ne, Ar, or Kr, for example. The pressure inside the vacuum chamber (32) may be adjusted by the volume of gas that is introduced while discharging the gas inside the vacuum chamber (32) with the vacuum pump (33), or the pressure may be adjusted by vacuum-pumping the chamber to achieve a higher vacuum than the desired pressure, terminating vacuum-pumping, and then introducing a gas until the desired pressure is reached. In addition, the discharge volume of the pump may be adjusted so as to control the pressure inside the vacuum chamber (32) by providing a pressure control valve or the like between the vacuum chamber (32) and the vacuum pump (33).

Shutters (39) for blocking the spaces leading from the evaporation sources (38) to the support (3) are also provided between the evaporation sources (38) and the support (3) so as to freely open and close in the horizontal direction. These shutters (39) make it possible to prevent substances other than the target substance deposited on the surface of the phosphor from being evaporated by the evaporation sources (38) and being deposited on the support (3) in the initial stage of vapor deposition.

The production method of the scintillator panel of the present invention using the vapor deposition device (31) described in detail above will be described in detail hereinafter.

First, the support (3) is attached to the support holder (35). The evaporation sources (38) are then disposed on the periphery of the circle centered on the central line perpendicular to the support (3) in the vicinity of the bottom surface of the vacuum chamber (32). Next, a crucible, a boat, or the like is filled with a phosphor parent compound (CsI: no activator) and an activator (TlI) and is then set in the evaporation source (38). In this case, a plurality of crucibles or boats may be used.

In order to remove impurities in the phosphor parent material and the activator with which the crucible or boat is filled, preheating may be performed. Preheating is preferably performed at a temperature not greater than the melting point of the material to be used. For example, in the case of CsI, the preheating temperature is preferably from 50 to 550° C. and more preferably from 100 to 500° C. In the case of TlI, the preheating temperature is preferably from 50 to 500° C. and more preferably from 100 to 500° C.

The gas inside the vapor deposition device (31) is temporarily discharged, and Ar gas is introduced. After the pressure is set to from 0.001 to 10 Pa and preferably from 0.01 to 1 Pa from the perspective of the formation of independent columnar crystals, the support (3) is rotated. Although dependent on the size of the device, the rotation speed is preferably from 2 to 15 rpm and more preferably from 4 to 10 rpm. Next, the phosphor is vapor-deposited by heating the crucible containing the phosphor parent compound (CsI: no activator) so as to form a foundation layer (first phosphor layer). At this time, the temperature of the support (3) is preferably from 5 to 60° C. and more preferably from 15 to 50° C. Although also dependent on the crystal diameter or the thickness of the phosphor layer (4), the thickness of the foundation layer is preferably from 0.1 to 50 µm. Next, the heating of the support (3) is initiated, and the temperature is increased from 150 to 250° C. to initiate the evaporation of the content of the crucible containing the remaining phosphor parent compound (CsI: no activator) and the activator (TlI). At this time, the phosphor parent compound is preferably evaporated at a faster vapor deposition rate than that of the foundation layer with consideration of productivity. Although also dependent on the thickness of the foundation layer or the phosphor layer (4), vapor deposition is preferably performed at a rate from 5 to 100 times faster and more preferably from 10 to 50 times faster than at the time of the vapor deposition of the foundation layer. In the evaporation method of the activator, the activator alone may be evaporated, but it is also possible to create an evaporation source (38) which mixes the CsI and TlI and to evaporate the contents by heating the evaporation source (38) to a temperature at which CsI does not evaporate and only TlI evaporates (for example, 500° C.).

The support (3) heated at the time of vapor deposition must be cooled in order to be removed due to the high temperature. The support (3) can be cooled without damage by setting the average cooling rate to within the range of from 0.5 to 10° C./min in the step of cooling the phosphor layer (4) to 80° C. This is particularly effective when a comparatively thin substrate such as a polymer film with a thickness of not less than 50 µm and not more than 500 µm is used for the support (3), for example. In this cooling step, it is particularly preferable for cooling to be performed in an atmosphere with a vacuum of from $1 \times 10^{-5}$ Pa to 0.1 Pa. At the time of the cooling step, a means for introducing an inert gas such as Ar or He into the vacuum chamber (32) of the vapor deposition device (31) may also be provided. The average cooling rate described here is a rate determined by continuously measuring time and temperature while cooling from the beginning of the cooling step (at the time of the completion of vapor deposition) to 80° C. and finding the cooling rate per minute during this time.

After vapor deposition is complete, the phosphor layer (4) may be subjected to heat treatment. In addition, reactive vapor deposition may be performed in the vapor deposition method by introducing a gas such as $O_2$ or $H_2$ as necessary.

《Heating Step after Vapor Deposition》

This is a step of heating the phosphor layer obtained in the vapor deposition step at normal pressure or in a vacuum.

When heating in a vacuum, heating may be performed continuously after the phosphor layer is formed in the vapor deposition step without returning the vacuum inside the vacuum chamber to normal pressure or may be performed after moving the phosphor to a separate vacuum heating device, but it is preferable to heat the phosphor layer inside the same vacuum chamber after the vapor deposition step without returning the vacuum to normal pressure.

Figure 2:
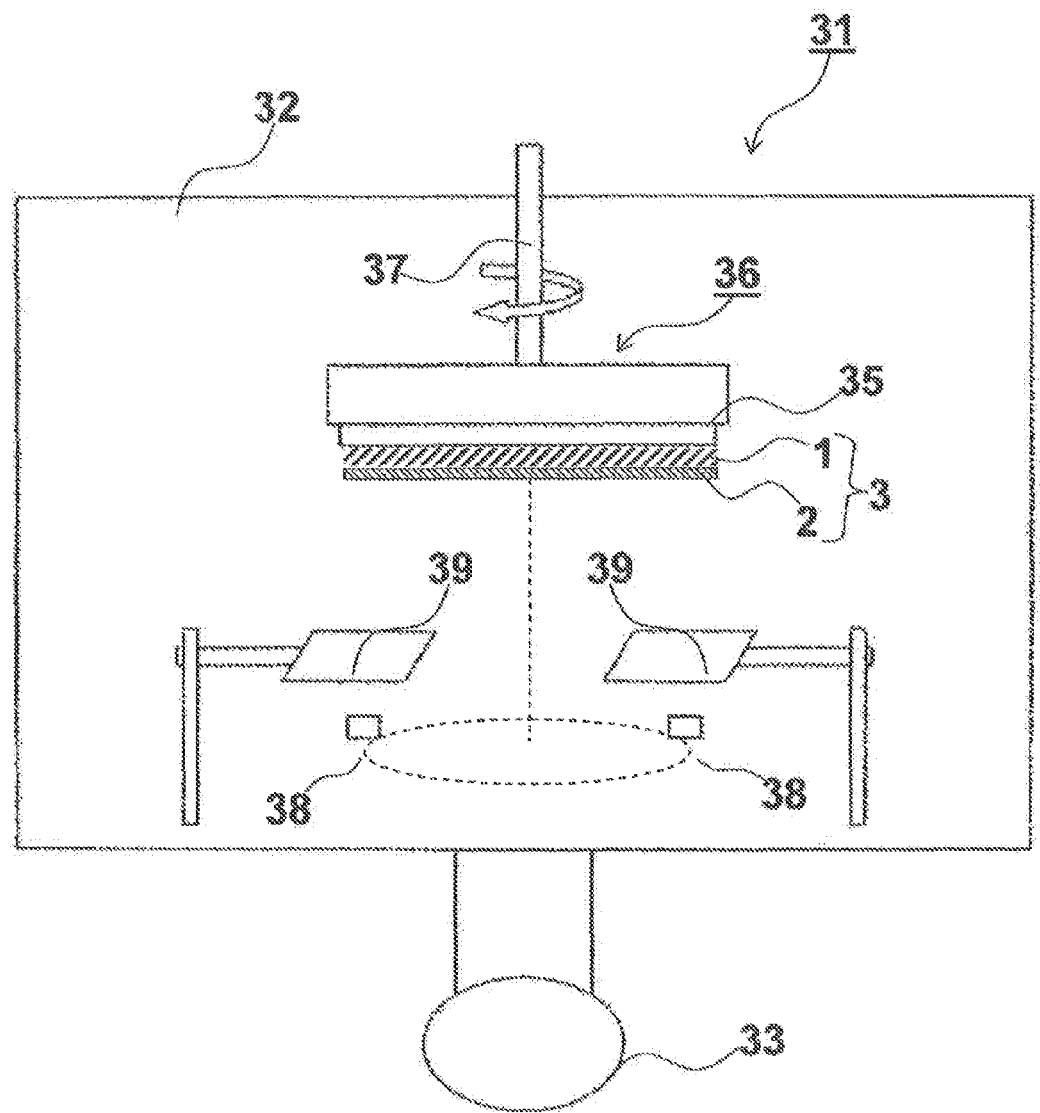
FIG. 2 is a schematic diagram of a vapor deposition device (31) which, when producing the scintillator plate and the radiation detection panel of the present invention, is used in a vapor deposition method suitable for creating a phosphor layer provided on the scintillator and the radiation detection panel. The straight dotted line illustrates a straight line extending vertically from the center of gravity of a support (3), and the circular dotted line illustrates a circle with one point of the straight line used as the center. Evaporation sources (38) are disposed at positions facing one another on the periphery.

Examples of the heating mechanism of the support holder (35) of FIG. 2 in the method of heating the phosphor layer without returning the vacuum to normal pressure after the vapor deposition step include a mechanism for circulating a warm or heat medium (not illustrated) or a halogen lamp (not illustrated).

The heating temperature is preferably from 80 to 350° C. and more preferably from 100 to 300° C. from the perspective of improving the transparency of the crystals.

《Phosphor Protuberance Repair Step》

The scintillator panel produced as described above sometimes contains protuberances generated during the formation of the phosphor layer, as a result of abnormal crystal growth of the phosphor due to dust or the like in vapor deposition. The columnar crystals forming protuberances are repaired as described below.

The scintillator panel is sandwiched by two rigid plates on back side of the support and the front side of the phosphor layer, and heat treatment is then performed while pressure is applied to the rigid plates.

The method for applying pressure is not particularly limited and may include pressure application with a weight or mechanical pressure application, but a method of hermetically seal and decompression using a bag-like heat-resistant plastic film container is preferable. More specifically, pressure by atmospheric pressure can be applied by sandwiching the scintillator panel with the two rigid plates on the back side of the support and the front side of the phosphor layer, housing the two rigid plates inside a bag-like plastic film container, and then hermetically sealing and decompressing the container. This method is preferable in that pressure can be applied uniformly to the rigid plates and in that the amount of pressure applied can be adjusted easily by adjusting the amount of decompression inside the container.

The amount of pressure applied is preferably from 0.001 MPa to 10 MPa and more preferably from 0.01 MPa to 1 MPa. The protuberances can be sufficiently displaced to the resin layer side by setting the amount of applied pressure to at least 0.001 MPa. On the other hand, by setting the amount of applied pressure to not more than 10 MPa, it is possible to suppress damage to the phosphor, and there is no loss of image quality.

The heat treatment temperature is preferably from 50° C. to 200° C. and even more preferably from 90° C. to 160° C. By setting the heating temperature to at least 50° C., it is possible to facilitate the displacement of the protuberances to the resin layer side. By setting the heating temperature to not more than 200° C., it is possible to suppress influence on image quality such as diminished luminance.

《Phosphor Protective Layer Forming Step》

Figure 3:
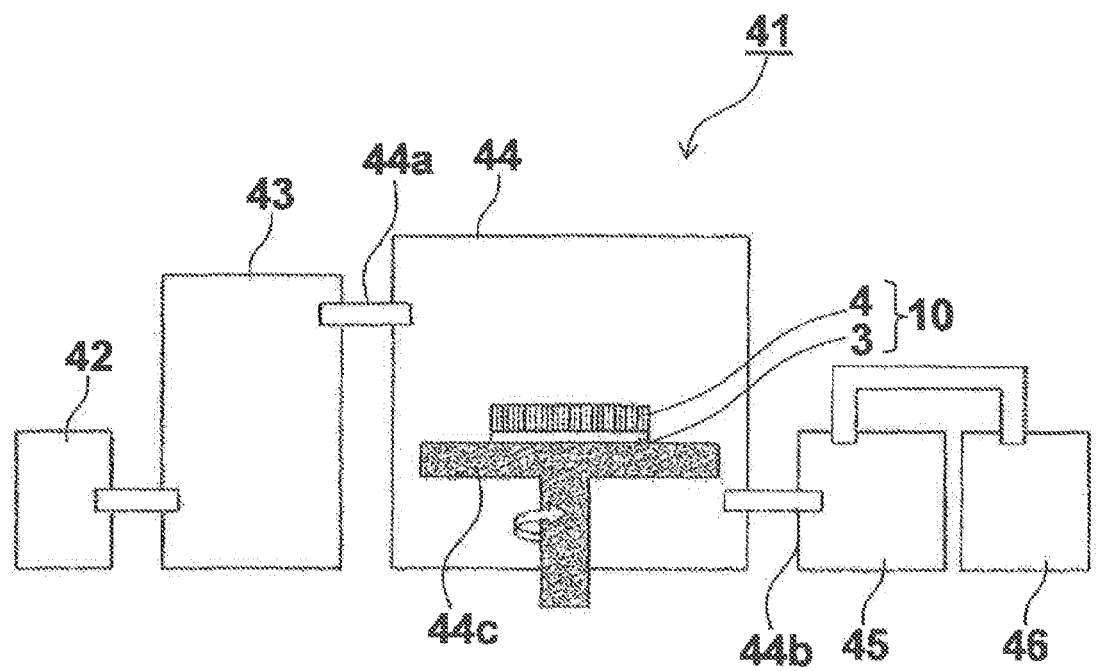
FIG. 3 is a schematic diagram of a CVD vapor deposition device (41) suitable for creating a phosphor protective layer on the phosphor layer side surface of the scintillator plate of the present invention.

FIG. 3 is a schematic view of a CVD vapor deposition device suitable for the formation of a protective layer illustrating an example of forming a protective layer comprising a polyparaxylylene film on the surface of a phosphor layer (4) of a scintillator plate (10).

The CVD vapor deposition device (41) comprises a vaporizing chamber (42) for vaporizing diparaxylylene introduced as a raw material of polyparaxylylene, a thermal decomposition chamber (43) for radicalizing the vaporized diparaxylylene by heating, a vapor deposition chamber (44) for vapor-depositing the radicalized diparaxylylene onto the phosphor layer (4) on the support (3) on which a scintillator is formed, a cooling chamber (45) for deodorization and cooling, and an gas discharge system (46) having a vacuum pump.

Here, the vapor deposition chamber (44) has an introduction port (44a) for introducing polyparaxylylene radicalized in the thermal decomposition chamber (43) and a discharge port (44b) for discharging excess polyparaxylylene and also has a turn-table (vapor deposition table) (44c) for supporting a sample on which a polyparaxylylene film is to be vapor-deposited.

First, the phosphor layer (4) of the scintillator plate (10) is placed face-up on the turn-table (44c) of the vapor deposition chamber (44).

Next, the diparaxylylene vaporized by heating to 150 to 180° C. in the vaporizing chamber (42) and radicalized by heating to 680 to 700° C. in the thermal decomposition chamber (43) is introduced into the vapor deposition chamber (44) from the introduction port (44a), and a protective layer (polyparaxylylene film) of the phosphor layer (4) is vapor-deposited to a thickness of from 1 to 20 μm. In this case, the inside of the vapor deposition chamber (44) is maintained at a vacuum of from 1 to 10 Pa. The turn-table (44c) is rotated at a speed of from 1 to 6 rpm. The excess polyparaxylylene is discharged from the discharge port (44b) and introduced into the cooling chamber (45) for deodorization and cooling and the gas discharge system (46) having a vacuum pump.

Alternatively, a protective layer may also be formed by applying a hot-melt resin to a release sheet coated with a release agent, placing the hot-melt resin surface on the surface of the phosphor layer of the scintillator panel, and attaching the surfaces while applying pressure with a roller heated to 120° C.

When an adhesive is used for adhesion with the planar light receiving element surface, it is preferable to adjust the thickness of the protective layer so that the total thickness of the protective layer and the adhesive layer is not more than 20 μm.

In addition, when a resin film is used as a substrate, the protective layer can be formed after the cutting of the scintillator plate.

《Cutting Step》

In the present invention, the scintillator panel having a larger area than the area of the surface of the photoelectric element to be used may be cut in accordance with the area corresponding to the surface of the photoelectric element to be used. In this case, operations such as vapor deposition on the individual photodetectors are unnecessary since the scintillator panel is cut after the phosphor layer is formed on the support. That is, vapor deposition is performed at the largest size that can be produced in the vapor deposition device, and scintillator panel is then cut into the desired size as necessary, which yields merits from the perspectives of production efficiency and shipping due date. A typical example of the method used in the cutting method for cutting the scintillator panel of the present invention will be described hereinafter with reference to the drawings.

Figure 4:
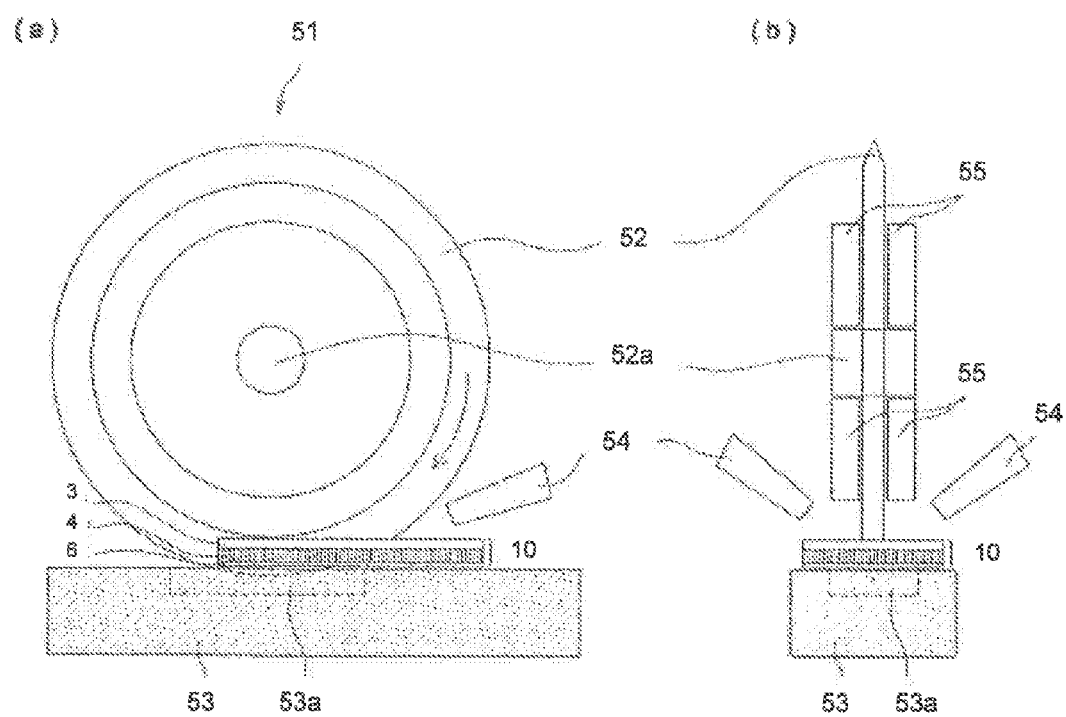
FIG. 4 is a cross-sectional view schematically illustrating one example of blade dicing used in a cutting step.

FIG. 4 (a) is a side cross-sectional view, and FIG. 4 (b) is a front cross-sectional view of an example of blade dicing in which a scintillator plate 10 is cut after a protective layer 6 is formed. The scintillator plate 10 is disposed on a dicing table 53 of a dicing device 51 with the protective layer 6 side on the bottom. The scintillator plate 10 is cut from the support 3 side by a blade 52. The support 3 is amorphous carbon with a thickness of 1 mm. The blade 52 cuts out the scintillator plate 10 by rotating around a rotary shaft 52a. A groove 53a is provided on the dicing table 53. Support members 55 are provided at both sides of the blade. In order to cool frictional heat, cooling air is blown into the cutting part from a nozzle 54 through both sides of the blade 52. The temperature of the cooling air is not more than 4° C., and the humidity in the room is not more than 20% in order to prevent condensation. Blade dicing can be suitably applied in cases in which the main component of the support is carbon, aluminum, or glass.

Next, an example of laser cutting is illustrated.

Figure 5:
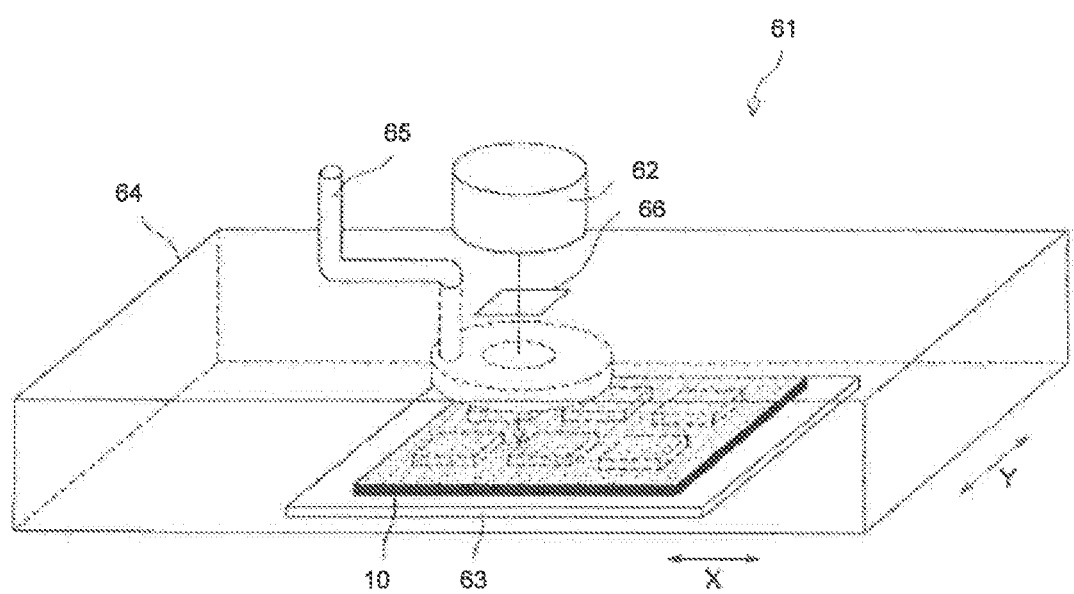
FIG. 5 is a perspective view schematically illustrating one example of laser cutting used in a cutting step.

FIG. 5 is a schematic perspective view of a device used for laser cutting illustrating an example of laser cutting to cut a scintillator plate 10 on which a protective layer is not formed. The laser cutting device 61 is provided with a purge chamber 64 formed in a box shape. The inside space of the purge chamber 64 is made almost completely sealed so that dust or the like floating in the outside space does not intrude into the purge chamber 64. The inside of the purge chamber 64 is preferably a low-humidity environment. A light-transmitting window 66 for transmitting laser light is provided on the top surface of the purge chamber 64. In addition, a discharge tube 65 to lead floating matter such as dust to the outside of the purge chamber 64 is also provided.

The scintillator plate 10 is placed on a support table 63 of the laser cutting device 61, and the scintillator plate 10 is attached and held on the support table 63. After being placed on the support table 63, the scintillator plate 10 is positioned directly under a laser irradiation part of a laser generator 62 by a support table moving means (not illustrated). A laser beam is emitted from the laser generator 62, and the scintillator plate 10 is irradiated with the laser beam.

The irradiation conditions are as follows: YAG-UV (yttrium aluminum garnet crystal: wavelength of 266 nm), pulse laser beam with a beam diameter of 20 μm at a frequency of 5000 Hz, and output of 300 mW. The scintillator plate 10 is cut while being moved in an X-direction and a Y-direction by the support table moving means (not illustrated). The laser used in the present invention is preferably an ultraviolet laser beam with a wavelength of approximately 266 nm. In the case of a laser having a wavelength of approximately 266 nm, it is possible to process a workpiece by the heat effect of the laser and to dissociate the molecular bonds such as C—H bonds or C—C bonds with an organic material, simultaneously. That is, the phosphor layer is cut by the heat effect, and the support is cut by the dissociation of molecular bonds. Therefore, since the phosphor layer is cut by heat effect and the support is cut by the dissociation of molecular bonds, it is possible to prevent crystal cracking in the cut parts.

Laser cutting can be applied when the support is made of a resin film or glass, and the laser cutting device illustrated in FIG. 5 can be preferably applied in the case of a resin.

《Optical Compensation Layer Forming Step》

First, a transparent adhesive is applied to either the light output surface of the scintillator plate or the light receiving surface of a photodetector.

If the transparent adhesive is a two-component mixed type into which a curing agent is added or if a spacer is mixed into the adhesive to control the coating thickness, air bubbles generated at the time of mixing must be removed.

Vacuum degassing must be performed before coating, and the vacuum pressure at the time of degassing is a lower pressure than the vacuum attachment atmosphere described below. This is because air bubbles will reappear from the adhesive at the time of vacuum attachment if the vacuum pressure is high.

Examples of coating methods for the adhesive include spin coating, screen printing, and dispensing.

The following conditions are required for coating. (a) Thick film coating of at least 10 μm must be possible. (b) Since an adhesive cured when left in a room temperature atmosphere for a long time may also be handled, there are also cases in which parts cannot be used due to curing, so disposable parts must be inexpensive. (c) Since there is a possibility that the coating thickness may be changed depending on the location, it must be possible to easily change the amount of coating. The device itself must be inexpensive.

In the case of spin coating, it is necessary to apply multiple coats in order to achieve thick film coating. Further, it is not possible to change the coating thickness depending on the location. Therefore, spin coating is not suitable as a method used in the production method for the scintillator plate or the like of the present invention.

Screen printing involves expensive printing plates, which are disposable products, and two types of printing plates must be prepared in order to change the coating thickness depending on the location, which is troublesome. Screen printing is therefore also unsuitable.

On the other hand, with a dispenser, the coating thickness can be increased based on the pressure or the needle diameter, and the coating position can be controlled robotically, so it is simple to partially change the amount of coating. Moreover, the disposable parts involved are needles and syringes, which can be obtained relatively inexpensively.

Since a dispenser only allows coating in a dot pattern or a line pattern, film thickness irregularities are more substantial than in spin coating or screen printing.

Although there is a concern that large air bubbles may form when a scintillator is attached, air bubbles are released into the atmosphere and become small by attaching the scintillator in a vacuum as described below, so this problem is eliminated.

In addition, it is preferable for the spacing between the needle and the substrate to be coated to be small in order to realize the accurate amount and coating shape with the dispenser, and the spacing is set to not more than 0.3 mm under the production conditions of this device.

The transparent adhesive can be applied to either of the scintillator plate or the photodetector, but taking into consideration the warping of the material to be coated, it is preferable to apply the transparent adhesive to the scintillator panel with the dispenser in the present invention.

The amount of the transparent adhesive to be applied is determined in advance so as to achieve a prescribed thickness, pressure is applied to the scintillator plate and the photodetector respectively from above and below so as to facilitate the flow of the transparent adhesive. When CsI is used as a scintillator, since CsI is comparatively weak and has a pressure resistance of only approximately 1 $kg/cm^2$, it is necessary to press with a lower pressure than this pressure. Specifically, pressure of not more than 100 Pa is preferable.

In order to attach the scintillator with a low pressure, the viscosity of the transparent adhesive should be low and is preferably not more than 50 Pa.

At the time of adhesion, it is preferable to apply pressure of from 10 to 500 $g/cm^2$ until the adhesive hardens. Air bubbles are removed from the adhesive layer by applying pressure. When a hot-melt resin is used as a protective layer, pressure of from 10 to 500 $g/cm^2$ is applied, and while this state is maintained, the outside ambient atmosphere is decompressed from an atmospheric pressure of $1.2 \times 10^5$ Pa to 100 Pa.

Once the prescribed vacuum pressure is reached, the scintillator plate is brought close to the photodetector and the upper and lower substrates are attached. At this time, air bubbles may generate between the dot-shaped transparent adhesives.

After the upper and lower substrates are attached, the outside ambient atmosphere is returned to atmospheric pressure. The air bubbles generated previously become small by the atmospheric pressure.

Assuming that the remaining air bubbles are column-shaped air bubbles with a height of 50 μm, the air bubbles are 37.8 μm in radius.

The pixel size of the photoelectric conversion elements is from approximately 100 to 160 μm, so there is not even a single pixel defect as long as the air bubbles are of this size.

Once all of the air bubbles have been completely reduced in size after being left to stand at atmospheric pressure for approximately 15 to 18 hours, the adhesive is cured by applying heat. Since the heat resistance temperature of CsI is 100° C., curing is performed for one hour at a curing temperature of around 90° C.

After being heated to a temperature approximately 10° C. higher than the melting initiation temperature of the hot-melt resin and left to stand for from 1 to 2 hours, the adhesive is gradually cooled. If the adhesive is cooled rapidly, the pixels of the planar light receiving elements will be damaged by the shrinkage stress of the hot-melt resin. The adhesive is preferably cooled to not more than 50° C. at a rate of not more than 20° C./hour.

EXAMPLES

The present invention will be described in further detail hereinafter using working examples, but the embodiments of the present invention are not limited to these examples.

Working Example 1

Step of Forming an Undercoat Layer on a Substrate

Dry Process

A "UPILEX-125S" polyimide film (thickness: 125 μm) produced by Ube Industries, Ltd. was placed in the CVD device of FIG. 3 as a substrate, and an undercoat layer comprising parylene C having a melting point of 290° C. (produced by Parylene Japan Co., Ltd.) was formed on one side thereof. The thickness of the undercoat layer was 3 μm. The substrate and the undercoat layer are then formed integrally to serve as a support.

Parylene C has a basic structure in which a benzene ring is polymerized via —$CH_2$—, and one hydrogen atom of this benzene ring is substituted with chlorine.

《Vapor Deposition Step》

This is described with reference to FIG. 2.

First, two resistance heating crucibles were respectively filled with cesium iodide (CsI) serving as a phosphor parent compound and an activator (TlI), and these were used as evaporation sources (38). The support (3) was placed in a metal frame (not illustrated) of the support holder (35), and the spacing between the support (3) and the evaporation sources (38) was adjusted to 400 mm.

Next, the gas inside of the vapor deposition device (1) was temporarily discharged, and Ar gas was introduced. After the vacuum was adjusted to 0.05 Pa, the support (3) was rotated together with the support holder (35) at a speed of 6 rm. At this time, the temperature of the support (3) was set to 30° C. by a heating heater (not illustrated) of the support holder (35).

Next, the vapor deposition of the phosphor was initiated by heating the resistance-heating crucibles of the evaporation sources (38).

The temperature of the support was set to 30° C., and an undercoat layer was formed with a thickness of 10 μm. The heating of the support was then initiated, and the formation of the phosphor layer was then initiated once the temperature of the support increased to 200° C.

When the thickness of the phosphor layer reached 400 μm (when the height of the phosphor columnar crystals reached 400 μm), vapor deposition was terminated, and a scintillator plate having a substrate, an undercoat layer, and a phosphor layer was obtained.

《Optical Transmittance Measurement》

The optical transmittance (A) of the tip side portion of the phosphor columnar crystals of the resulting scintillator plate and the optical transmittance (B) of the base side portion were respectively measured as follows.

〈Optical Transmittance (A) of the Tip Side Portion〉

1) The phosphor layer is peeled from the undercoat layer.

2) The phosphor layer is cut out from the base side using a diamond knife, a glass knife, or the like until the phosphor layer thickness is cut in half.

3) An LED light source (produced by Shodensha, Inc.) in which white LEDs were arranged in a ring shape was disposed 10 cm from a photodiode light receiving element ("S2281" produced by Hamamatsu Photonics K.K.) so that the photodiode light receiving element was located in the center of the ring, and the ratio of the intensity of light transmitted through the phosphor layer with half the original thickness and the intensity of light measured without using the phosphor layer was defined as the optical transmittance.

Optical transmittance=(amount of light when the phosphor layer was disposed on the front surface of the light receiving element)/(amount of light when the phosphor layer was not disposed)

《Optical Transmittance (B) of the Base Side Portion》

The optical transmittance was measured in the same manner as in the case of the optical transmittance (A) with the exception of performing cutting from the tip end in 2) described above.

《Protuberance Repair Step》

A glass made by Corning Incorporated (EAGLE 2000 or EAGLE XG) was placed over the support surface and the phosphor surface, and heat treatment was performed for 2 hours at 100° C. while a load of 0.1 MPa was applied.

《Cutting Step》

A laser cutting device set to the following cutting conditions was used to cut the resulting scintillator into a prescribed size: YAG-UV (yttrium aluminum garnet crystal: wavelength of 266 nm), pulse laser beam with a beam diameter of 20 μm at a frequency of 5000 Hz and output of 300 mW.

《Step of Preparing a Protective Layer》

The cut scintillator plate was placed in the CVD device of FIG. 3, and a protective layer comprising polyparaxylylene was formed on the surface of the phosphor layer. The thickness of the protective layer was 3 μm.

《Step of Forming an Optical Compensation Layer》

An optical compensation layer was further formed on the protective layer formed on the surface of the phosphor layer of the scintillator plate.

The optical compensation layer was formed by coating the protective layer with a heat-curable transparent epoxy resin adhesive to a thickness of 15 μm using the dispenser coating method and then curing the adhesive by heating.

After a circuit board and a photoelectric conversion element array were formed sequentially in advance on a flat surface made of glass, a flattening layer was formed by applying an acrylic resin to the photoelectric conversion element array surface so that the average surface roughness (Ra) of the outermost surface of the photoelectric conversion element array facing the phosphor layer was 0.003 μm. The refractive index n of the epoxy resin forming the optical compensation layer was approximately 1.55, and the refractive index n of CsI:Tl of the phosphor columnar crystals was approximately 1.8, while the refractive index n of the acrylic resin forming the flattening layer was approximately 1.5. Therefore, the aforementioned conditions regarding the refractive indices are satisfied.

《Light Emission Luminance Measurement》

A radiation detection panel was formed by placing a CMOS flat panel (X-ray CMOS camera system "Shad-o-Box 4KEV" produced by Teledyne Rad-icon Imaging Corp.) with dimensions of 10 cm×10 cm on the phosphor layer side surface of a scintillator plate on which a protective layer and an optical compensation layer were further formed.

The scintillator plate built in each radiation panel was irradiated with X-rays having a tube voltage of 80 kVp from the surface of the substrate side. The measurement count value was used as the light emission luminance (sensitivity) and expressed as the relative value when the light emission luminance of a radiation detection panel obtained from the scintillator plate of Comparative Example 1 was defined as 100.

The measurement results of Working Example 1 are shown in Table 1.

Working Example 2

A scintillator plate was produced in the same manner as in Working Example 1 with the exception of changing the vacuum from 0.05 Pa to 0.1 Pa in Working Example 1.

Working Example 3

A scintillator plate was produced in the same manner as in Working Example 1 with the exception of changing the step of forming the undercoat layer on the substrate as follows in Working Example 1.

Step of Forming an Undercoat Layer on a Substrate

Wet Process

Silver was sputtered onto a polyimide film with a thickness of 125 μm ("UPILEX-125S" produced by Ube Industries, Ltd.) as a substrate so that the film thickness was 1,000 Å (=100 nm).

A Vylon (registered trademark) "200 (brand)" (produced by Toyobo Co., Ltd.) with a glass transition point of 67° C. was dissolved in methyl ethyl ketone (MEK) and applied so as that a dry film thickness was 3 μm, to form an undercoat layer.

Working Example 4

A scintillator plate was produced in the same manner as in Working Example 3 with the exception of changing the vacuum from 0.05 Pa to 0.1 Pa in Working Example 3.

Working Example 5

A scintillator plate was produced in the same manner as in Working Example 3 with the exception of changing the vacuum from 0.05 Pa to 0.3 Pa in Working Example 3.

Working Example 6

A scintillator plate was produced in the same manner as in Working Example 3 with the exception of heating the base portion of the phosphor columnar crystals for 1 hour at 200° C. with a halogen lamp after vapor deposition while maintaining the vacuum inside the vapor deposition device in Working Example 5.

Comparative Example 1

A scintillator plate was produced in the same manner as in Working Example 1 with the exception of changing from the paraylene C having a melting point of 290° C. to parlylene N having a melting point of 420° C. (produced by Parylene Japan Co., Ltd.) as an undercoat layer and changing the support temperature in the vapor deposition step from 30° C. to 80° C. in Working Example 1. The parylene N has a structure in which a benzene ring is polymerized via $-CH_2-$.

Comparative Example 2

A scintillator plate was produced in the same manner as in Working Example 2 with the exception of changing from the paraylene C having a melting point of 290° C. to parlylene N having a melting point of 420° C. (produced by Parylene Japan Co., Ltd.) as an undercoat layer and changing the support temperature in the vapor deposition step from 30° C. to 80° C. in Working Example 2.

Comparative Example 3

A scintillator plate was produced in the same manner as in Working Example 2 with the exception of changing from the paraylene C having a melting point of 290° C. to parlylene N having a melting point of 420° C. (produced by Parylene Japan Co., Ltd.) as an undercoat layer, changing the support temperature in the vapor deposition step from 30° C. to 80° C., and changing the vacuum from 0.1 Pa to 0.3 Pa in Working Example 2.

Comparative Example 4

A scintillator plate was produced in the same manner as in Working Example 1 with the exception of changing the undercoat layer from the parylene C having a melting point of 290° C. to "PETI-330" (produced by Ube Industries, Ltd.), which is a polyimide resin with a glass transition point of 330° C., in Working Example 1.

The optical transmittance ratio and light emission luminance were measured in the same manner as in Working Example 1 for each of the scintillator plates obtained in Working Examples 2 to 6 and Comparative Examples 1 to 4. The results are shown in Table 1.

DESCRIPTION OF REFERENCE CHARACTERS

1 . . . Substrate
2 . . . Undercoat layer
3 . . . Support
4 . . . Phosphor layer
4a . . . Tip end portion of the phosphor columnar crystals (5) when the phosphor layer (4) is halved in terms of thickness in the lamination direction
4b . . . Base end portion of the phosphor columnar crystals (5) when the phosphor layer (4) is halved in terms of thickness in the lamination direction
5 . . . Phosphor columnar crystals
t . . . Thickness of the phosphor layer (4)
6 . . . Protective layer
10 . . . Scintillator plate
11 . . . Photoelectric conversion element array
12 . . . Circuit board
13 . . . Photodetector
20 . . . Radiation detection panel
31 . . . Vapor deposition device
32 . . . Vacuum chamber
33 . . . Vacuum pump
35 . . . Support holder
36 . . . Support rotating mechanism
37 . . . Support rotary shaft
38 . . . Evaporation source
39 . . . Shutter
41 . . . CVD vapor deposition device
42 . . . Vaporizing chamber
43 . . . Thermal decomposition chamber
44 . . . Vapor deposition chamber
44a . . . Introduction port
44b . . . Discharge port
44c . . . Turn-table
45 . . . Cooling chamber
46 . . . Gas discharge system
51 . . . Dicing device
52 . . . Blade
52a . . . Rotary shaft
53 . . . Dicing table
53a . . . Groove
54 . . . Nozzle
55 . . . Support member
61 . . . Laser cutting device
62 . . . Laser generator
63 . . . Support table

TABLE 1

| | | Undercoat layer of the scintillator plate | | Scintillator plate production conditions | | | | |
|---|---|---|---|---|---|---|---|---|
| | | | | Substrate temperature (° C.) | Vacuum (Pa) | Heating of the base portion of the phosphor columnar crystals | Optical transmittance ratio (%) | Light emission luminance (%) |
| Working Examples | 1 | Parylene C | Tm: 290° C. | 30 | 0.05 | — | 70 | 108 |
| | 2 | | | | 0.1 | — | 74 | 167 |
| | 3 | Vylon 200 | Tg: 67° C. | 30 | 0.05 | — | 88 | 175 |
| | 4 | | | | 0.1 | — | 89 | 175 |
| | 5 | | | | 0.3 | — | 90 | 176 |
| | 6 | | | | 0.3 | 200° C./1 hr | 99 | 179 |
| Comparative Examples | 1 | Parylene N | Tm: 420° C. | 80 | 0.05 | — | 29 | 100 |
| | 2 | | | | 0.1 | — | 49 | 105 |
| | 3 | | | | 0.3 | — | 50 | 106 |
| | 4 | Polyimide resin | Tg: 330° C. | 80 | 0.05 | — | 65 | 102 |

64 ... purge chamber
65 ... Discharge tube
66 ... Light-transmitting window

What is claimed is:

1. A scintillator plate, comprising an undercoat layer and a phosphor layer,
   wherein the phosphor layer comprises phosphor columnar crystals using the undercoat layer side as a base, and
   wherein when the phosphor layer is halved in terms of thickness in the lamination direction and the respective halves constitute a tip side portion and a base side portion of the phosphor columnar crystals, a ratio (B/A) of an optical transmittance (B) of the base side portion to an optical transmittance (A) of the tip side portion is not less than 70% and not more than 99%.

2. The scintillator plate according to claim 1, further comprising a substrate, wherein the substrate, the undercoat layer, and the phosphor layer are laminated sequentially.

3. A radiation detection panel, comprising the scintillator plate described in claim 1 and a photodetector.

4. The radiation detection panel according to claim 3, wherein the undercoat layer and the phosphor layer are laminated sequentially on the photodetector.

5. A radiation detection panel, comprising the scintillator plate described in claim 2 and a photodetector.

* * * * *